United States Patent [19]

Krigmont et al.

[11] Patent Number: 5,029,535
[45] Date of Patent: Jul. 9, 1991

[54] CONTROL OF ADDITION OF CONDITIONING AGENTS TO FLUE GAS

[75] Inventors: Henry V. Krigmont, Seal Beach; Everett L. Coe, Jr., Downey; Barry J. Southam, Irvine, all of Calif.

[73] Assignee: Wahlco, Inc., Santa Ana, Calif.

[21] Appl. No.: 523,311

[22] Filed: May 14, 1990

[51] Int. Cl.$^5$ .................. F23D 11/00; F23D 15/00
[52] U.S. Cl. ............................ 110/345; 110/216; 55/DIG. 30
[58] Field of Search ............... 110/345, 344, 216; 236/15 E; 431/5, 79; 55/DIG. 30

[56] References Cited

U.S. PATENT DOCUMENTS 3,993,429 11/1976 Archer ............................ 431/5
4,793,268 12/1988 Kukin et al. ............... 110/344 X Primary Examiner—Edward G. Favors
Attorney, Agent, or Firm—Howard E. Sandler

[57] ABSTRACT

Additions of conditioning agents to a particulate-containing flue gas stream are controlled by a controller operating from feedforward and feedback signals received from sensors in the combustion and gas cleanup system, and, optionally, from the power consumption level of the electrostatic precipitator. The flow rates of the conditioning agents, such as sulfur trioxide and ammonia, are thereby balanced to achieve an optimal removal of particulate matter and also sulfur and sulfur compounds from the gas stream before it is exhausted to the atmosphere. A typical feedforward signal is the boiler loading, and typical feedback signals include residual sulfur trioxide and ammonia levels and stack gas opacity.

29 Claims, 3 Drawing Sheets

CONTROL OF ADDITION OF CONDITIONING AGENTS TO FLUE GAS

BACKGROUND OF THE INVENTION

This invention relates to the control of particulate matter and the residual gas content of flue gases, and, more particularly, to a control system for the addition of conditioning agents to the flue gas.

In a coal-fired power plant, coal is burned to heat air, which in turn boils water to form steam. The steam drives a turbine and thence an electric generator, producing electricity. Besides heat, the burning of the coal produces gaseous pollutants such as sulfur and nitrogen oxides, and a solid particulate known as fly ash. Environmental protection laws mandate that the amounts of gaseous pollutants and solid particulate emitted from the power plant be maintained at acceptably low levels, and the present invention deals generally with the technology for controlling particulate emissions.

One widely used approach for removing the particulate fly ash from combustion or flue gas streams is electrostatic precipitation. The flue gas stream with entrained particulate is passed between highly charged electrodes that ionize the particles so that they are attracted to, and deposited upon, a collection electrode. The particulate may optionally be charged prior to entry into the precipitator to increase the efficiency of removal. The cleaned combustion gases are released to the atmosphere, and the precipitated particulate is removed from the collection electrode.

The efficiency of operation of electrostatic precipitators depends markedly upon the electrical resistivity of the particulate. If the resistivity of the particulate is too high, the ability of the precipitator to collect particulate is greatly reduced due to reactions, such as a back discharge, that interfere with collection. Consequently, an unacceptably high portion of the particulate is exhausted to the atmosphere. There exist conditioning procedures and apparatus for altering the electrical resistivity of the particulate by injection of conditioning agents into the combustion gas stream prior to its entering the electrostatic precipitator.

An example of such a treatment procedure is that disclosed in U.S. Pat. No. 3,993,429, and this approach has become widely accepted and used throughout the United States and the world. In this approach, a conditioning gas such as sulfur trioxide is injected into the combustion gas stream. The sulfur trioxide reacts with moisture in the gas stream to produce sulfuric acid that is deposited upon the surface of the particulate. The sulfuric acid reduces the electrical resistance of the particulate, which is equivalent to raising the electrical conductivity of the fly ash particulate, so that the electrostatic precipitation treatment works well. Conditioning treatments are routinely used where the sulfur content of the coal burned in the power plant is so low that the electrical resistivity of the resulting particulate is too high to permit the electrostatic precipitators to operate properly.

It is also known to add other conditioning agents such as ammonia to the flue gas. The ammonia reduces the amount of residual sulfur trioxide in the flue gas by forming ammonium sulfates and bisulfates. The ammonium bisulfates have the added beneficial effect of acting as a binder of the deposited fly ash in the electrostatic precipitator, so that there is a decreased likelihood that deposited fly ash can become reentrained in the gas stream to be exhausted through the stack and into the atmosphere.

Although the combination of sulfur trioxide and ammonia conditioning agents is currently used in some power plants to improve the quality of the gas stream emitted to the atmosphere, it is difficult to determine the correct amount of each conditioning agent to add to the flue gas stream to achieve optimal results, under the wide variety of operating conditions possible even in a single combustor and cleanup system. If relatively too much sulfur trioxide is added, there may be residual sulfur trioxide in the gas released to the atmosphere, a cause of acid rain. If relatively too little sulfur trioxide is added, the electrostatic precipitator does not operate at its highest collection efficiency, and particulate is released in the atmosphere.

The amount of conditioning agents added to the flue gas should be selected to optimize the system performance, for both gaseous and particulate emissions. At the present time, the control procedures are performed largely manually, based upon the observations of the operator. There exists a need for an improved approach to controlling the addition of conditioning agents to the stream of flue gas, so that the adjustments may be done automatically and reproducibly under a variety of operating conditions. The present invention fulfills this need, and further provides related advantages.

SUMMARY OF THE INVENTION

The present invention provides a method and apparatus for controlling the addition of conditioning agents to flue gas streams containing particulate matter. The approach utilizes measurements of system performance as the basis for feedforward and feedback control of the conditioning agent flow rates. It requires no direct operator input, and therefore is not affected by variations in operator judgment. Using the invention, the proper amounts of conditioning agents may be added to reach and maintain optimum or near-optimum system performance.

In accordance with the invention, apparatus for controlling the addition of conditioning agents to a particulate-containing flue gas stream that subsequently passes through a set of precipitation electrodes of an electrostatic precipitator before being exhausted to the atmosphere comprises a feedforward sensor that senses the flue gas and provides a feedforward signal indicative of the mass flow rate of particulate matter in the flue gas prior to the addition of the conditioning agents; a feedback sensor that senses the flue gas after the addition of the conditioning agents, and produces a feedback signal indicative thereof; and a controller that receives the feedforward signal and the feedback signal, and adjusts the amounts of the conditioning agents added to the flue gas stream based upon the values of the signals. The present system is operable when one conditioning agent is used, but its advantages are most effectively realized when two or more conditioning agents are used.

The "feedforward" signal is one that is measured at a location prior to (upstream of) the point where the conditioning agents are added to the flue gas stream. It preferably is used to indicate the general magnitude, volume, and mass of the particulate matter in the flue gas stream. Some typical feedforward signals are the boiler load, which can be measured as the flow rate of the gas stream from the boiler, fuel flow, the heat input to the boiler, or a related signal that can be correlated to boiler load. The "feedback" signal is one that is measured at a location subsequent to (downstream from) the point where the conditioning agents are added to the flue gas stream. It is used to indicate the effect of the conditioning agents. Typical feedback signals include one or more of the quantities opacity of the stack gas, the residual ammonia level of the effluent gas stream, the residual sulfur trioxide level of the effluent gas stream, and the power consumption of the electrostatic precipitator. Where two or more conditioning agents are used, two or more feedback signals may be used essentially simultaneously.

Also in accordance with the invention, a process for controlling the addition of conditioning agents to a stream of a flue gas containing particulate matter in a flue gas cleanup system having a conditioning agent injector, an electrostatic precipitator to which the flue gas passes after the conditioning agent is added, and an exhaust from the electrostatic precipitator comprises the steps of sensing the flue gas prior to the addition of the conditioning agent, and providing a feedforward signal indicative of the mass flow rate of the flue gas; sensing the flue gas after the addition of the conditioning agent, and providing a feedback signal indicative thereof; and controlling the amounts of the conditioning agents added to the flue gas stream based upon the values of the feedforward signal and the feedback signal.

The use of feedforward and feedback together permits more precise control of the injection of conditioning agents into the flue gas stream than has been heretofore possible. When a power plant is operating at a constant particulate output, the amounts of conditioning agents can be optimized using the feedback signals. Reaching an optimum control point may require many hours of adjustment and perturbation of the flow rates of the conditioning agents, because adjustments to the conditioning agent flows may not manifest themselves for minutes or hours in the measured feedback signals.

As the electrical output of the plant changes, the flue gas volume, and the volume of particulate to be removed, changes accordingly. To a first approximation, the required changes in the total flow rates of the conditioning agents are related to the feedforward signal indicative of particulate output. For example, if the feedforward signal were to double within a relatively short time, indicating a doubling of the mass flow rate of flue gas and thence particulate matter, the flow rates of the conditioning agents per unit time would be adjusted accordingly, in a typical case to double their prior values. That is, the flow rates of the conditioning agents in parts per million of flue gas would remain constant, but since the flue gas mass flow per unit time had doubled, the flow rates of the conditioning agents in mass per unit time would also be doubled. (The experience for a particular power plant might teach that the change should be nonlinear in a known manner, but that characteristic can also be incorporated into the control procedures.) This adjustment based upon the feedforward signal gives a quick response control signal that permits the flows of conditioning agents to be quickly adjusted to follow changes in particulate levels.

Once the gross flow rates of conditioning agents have been established using the feedforward signal, then a fine tuning adjustment is made using the feedback signals. Even though the flows of conditioning agents in parts per million may have been previously optimized for a particular power plant particulate output, a change in particulate output may necessitate reoptimization for the new level. The performance of electrostatic precipitators is dependent upon the particulate loadings and gas flow rates therethrough, and therefore reoptimization after a change in the flow rates may be required.

The present approach provides both a coarse control, the feedforward signal, and a fine control, the feedback signals, for controlling the flow rates of the conditioning agents. Although the feedback signals would be sufficient to attain optimized performance over long periods of time, the nonoptimal performance during the search for the optimum performance control points would result in large amounts of particulate lost to the atmosphere. The coarse control using the feedforward signal allows the conditioning flows to be adjusted to reach near-optimum total flows more quickly, reducing the amount of particulate lost to the atmosphere as the optimum point is sought.

The various feedforward and feedback signals are measured by commercially available sensors, and analyzed by the controller. The controller adjusts the mass flow rates per unit time of the conditioning agents in a continuous manner, without the need for human intervention. The approach accommodates the peculiarities of gas cleanup systems and their operation, and can be made to reflect the operating behavior of particular power plants. It therefore permits the flue gas composition to be controlled to achieve the best stack gas composition possible. Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
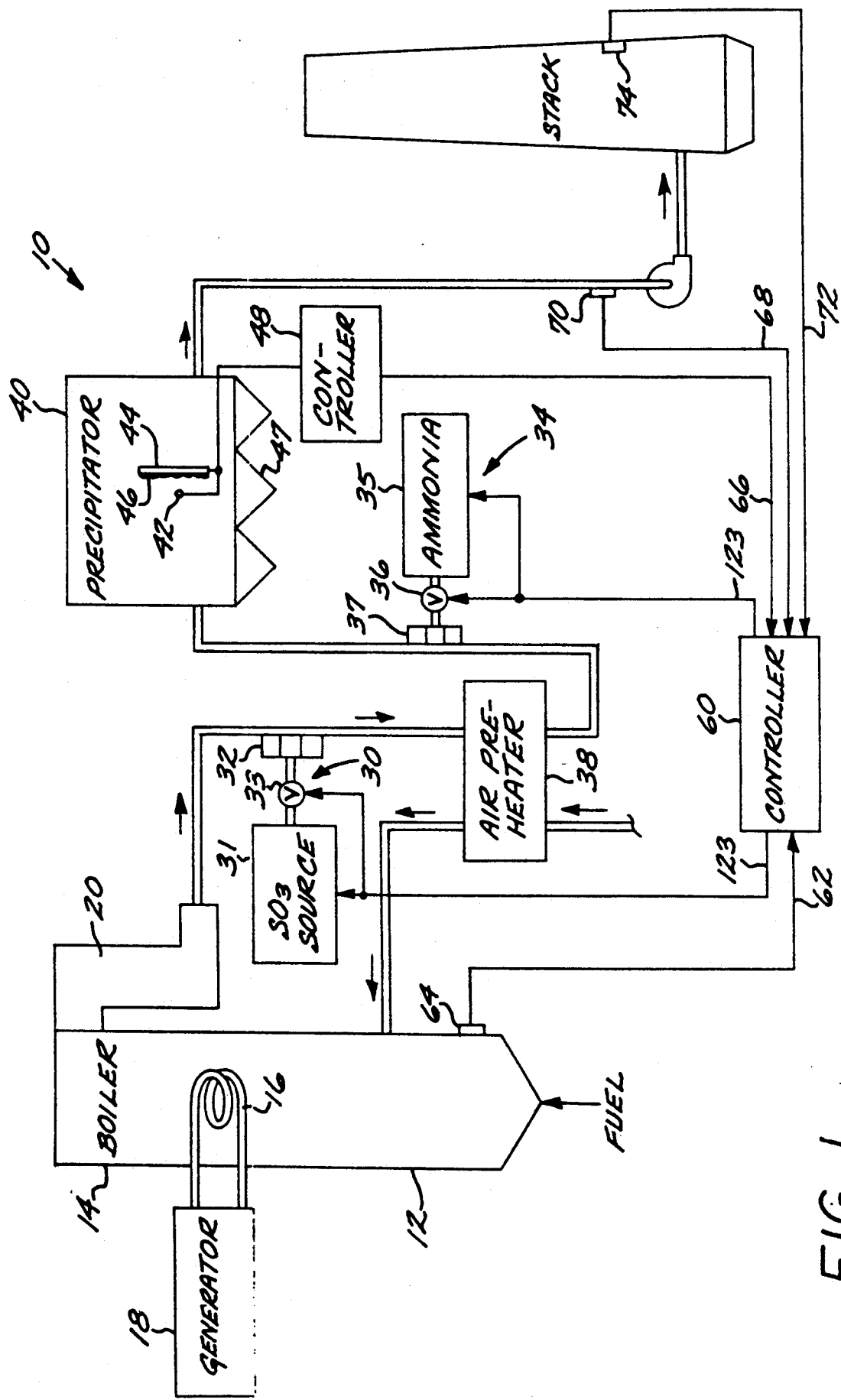
FIG. 1 is a schematic drawing of a flue gas conditioning system using the control system of the invention.

The present invention is preferably used in conjunction with an apparatus 10 for precipitating particulate from a combustion gas stream, which is depicted in FIG. 1. In a coal-fired power plant, coal is burned by a combustor 12, and the resulting hot flue or combustion gas is passed through a boiler 14, where it heats and boils water. The resulting steam in a loop 16 flows to a turbine/generator set 18, where electricity for consumption is produced. The steam is condensed, and the water flows back through the loop 16.

The flue gas stream 20 leaving the boiler 14 cannot normally be exhausted directly to the atmosphere, because it contains the particulate or fly ash produced in the combustor 12. If it were exhausted to the atmosphere, the fly ash would contaminate the environment. Fortunately, the fly ash can be largely removed from the flue gas stream 20 by electrostatic precipitator technology, if the fly ash has a proper electrical resistivity and the proper physical characteristics.

The fly ash produced by some types of coal, particularly many coals containing a low sulfur content, has too high an electrical resistance to be processed in a collection device such as an electrostatic precipitator, and therefore must be conditioned before entering the precipitator. It is known to inject conditioning agents into the combustion gas stream, as illustrated schematically in FIG. 1.

A first conditioning apparatus 30 injects a first conditioning agent (that may be a gas, a liquid, or a solid, but is preferably a gas) into the flue gas stream 20. The first conditioning agent is preferably sulfur trioxide ($SO_3$). The preferred first conditioning apparatus 30 therefore includes a source 31 of sulfur trioxide, and a plurality of sulfur trioxide injector nozzles 32 that extend into the flue gas stream 20 to inject the sulfur trioxide directly into the stream 20. A flow control device 33, such as a valve that controls the flow of sulfur or other feedstock for producing sulfur trioxide, meters the conditioning gas into the combustion gas stream 20 through the nozzles 32. A preferred source 31 is disclosed in U.S. Pat. No. 3,993,429, and a preferred construction of the nozzles 32 is disclosed in U.S. Pat. No. 4,179,071. The disclosures of both of these patents are incorporated herein by reference.

The injected sulfur trioxide reacts with moisture in the gas stream 20, and the resulting sulfuric acid deposits upon the particulate in the gas stream to increase its conductivity, or, alternatively stated, to lower its resistivity. More specifically, the sulfur trioxide reacts with the residual moisture in the flue gas stream to form sulfuric acid on the surface of the particulate, which increases the electrical conductivity of the particulate.

After the sulfur trioxide is injected, the flue gas 20 optionally passes through an air preheater 38, which is a heat exchanger that removes heat from the flue gas stream and heats the air that is used to burn the fuel in the combustor 12. Preferably, although not necessarily, the sulfur trioxide conditioning agent is injected upstream of the air preheater 38, where the temperature of the flue gas is typically about 400° C.

A second conditioning agent, preferably ammonia, is added to the flue gas stream 20, preferably downstream of the air preheater 38, where the temperature of the flue gas has been reduced to about 150° C. A second conditioning apparatus 34 for adding ammonia gas includes a source 35 for the gas, a valve 36 that regulates the flow of the gas, and an injector 37 of the same general type as the injector 32. The ammonia source 35 is preferably simply a tank of liquid ammonia with a heater to gasify the required amount of liquid, and ammonia is not formed by reaction at the site of the power plant.

After conditioning, if any, of the combustion gas stream 20, the flue gas flows to an electrostatic precipitator 40. The precipitator 40 may be of any of the many types commercially available and known in the art. The precipitator 40 includes a plurality of electrodes 42 charged with a high voltage, and grounded precipitation plates 44. The particulate in the gas stream 20 is charged by the electrostatic field established between the electrodes 42 and the plates 44, and is attracted to be deposited as a layer of dust 46 upon the plates 44 for subsequent removal.

When the layer 46 becomes so thick that its electrical resistivity rises and prevents efficient further removal of the particulate, the layer 46 is removed by "rapping" by rapping hammers (not shown) that physically strike the plates 44 so that the particulate in the layer 46 falls into hoppers 47 below the plates 44. The plates are thereby cleaned and made ready for further collection of particulate. One particularly troublesome source of particulate in the flue gas leaving the electrostatic precipitator is particulate that is reentrained in the gas stream after having been precipitated electrostatically. Reentrainment can result from a fast moving flue gas stream, and typically is most severe during rapping.

Figure 2:
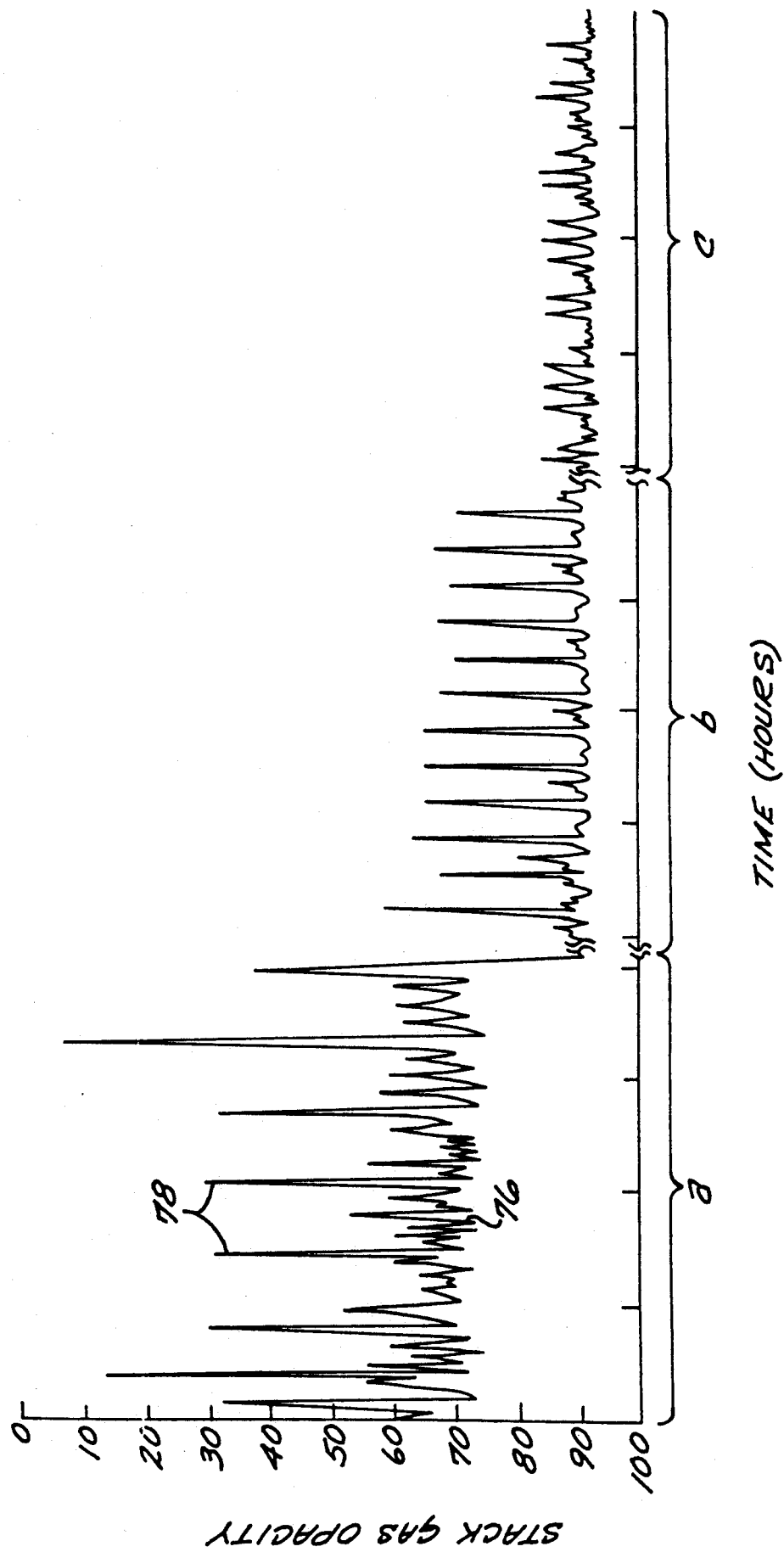
FIG. 2 is a composite graph of measured stack gas opacity versus time, for operating conditions of (a) no conditioning agents added, (b) sulfur trioxide added, and (c) both sulfur trioxide and ammonia added.

FIG. 2 is an exemplary graph of the measured opacity of the flue gas stream after it has left the electrostatic precipitator. The more particulate in the flue gas, the higher the measured value of opacity. The major spikes that occur periodically, indicated by numeral 78, are correlated to rapping events in the precipitator. The opacity level between the spikes, numeral 76, corresponds to the passthrough of particulate during normal operation of the electrostatic precipitator.

FIG. 2 illustrates the effect of adding conditioning agents. FIG. 2(a) is the measured opacity as a function of time when no conditioning agents are added. The opacity between spikes in the steady state region 76 and the magnitude of the spikes 78 are both high. FIG. 2(b) is the measured opacity when a small amount (here 5.5 parts per million) of sulfur trioxide is added to the flue gas stream. As compared with FIG. 2(a), the addition of the sulfur trioxide reduces the steady state opacity between spikes, as desired, but the opacity spikes experienced during rapping are of roughly the same magnitude in excess of the steady state level as in the case of the unconditioned gas, FIG. 2(a). FIG. 2(c) is the measured opacity when a larger amount (here 17 parts per million) of sulfur trioxide is added to the flue gas stream and a substantial amount (here 17 parts per million) of ammonia is also added. The steady state opacity between spikes is reduced further as compared with FIGS. 2(a) and 2(b), and, significantly, the opacity spikes are greatly reduced in magnitude as compared with either FIG. 2(a) or FIG. 2(b). Proper additions of sulfur trioxide and ammonia can therefore have a beneficial effect upon the power plant emissions.

The operation of the electrostatic precipitator 40, including the voltage and current applied to the electrodes 42, the rapping of the plates 44 to cause the collected particulate to fall into hoppers, and auxiliary control and display functions are under the control of an electrostatic precipitator controller 48.

The general configuration of the power plant and gas cleanup system just described are known in the art, and do not themselves form the present invention, although the present invention operates in conjunction with this system. Instead, the present invention relates to the control of the amount of conditioning agents added by the apparatus 30 and 34, to achieve the most acceptable combination of gaseous emission and particulate levels in the flue gas as it leaves the electrostatic precipitator and passes up the stack for release to the atmosphere. The following paragraphs provide a brief summary of the chemical and physical interactions resulting from the injection of the conditioning agents.

The ammonia injected by the second apparatus 34 reacts with the sulfur trioxide injected by the first apparatus 30, and water vapor in the flue gas stream 20, to produce ammonium bisulfate, $NH_4HSO_4$, or, under certain stoichiometric conditions, ammonium sulfate, $(NH_4)_2SO_4$. The ammonia reaction therefore reduces the amount of sulfur trioxide available to deposit upon the particulate to reduce its resistivity. On the other hand, the ammonium bisulfate has a melting point of about 147° C., so that a melted layer of the ammonium bisulfate may be present upon the surface of the particulate, tending to reduce its electrical resistivity. Additionally, the ammonium bisulfate on the surface of the particulate may act in the manner of a binding agent, binding the particulate together in the electrostatic precipitator. This binding action desirably reduces the tendency for reentrainment of the particulate after deposition in the dust layer 46, and particularly during rapping, thereby reducing the emitted particulate in the stack gas. The ammonium sulfate can also have an effect upon the efficiency of the electrostatic precipitator by modifying the space charge within the collecting elements.

While these various effects of injected sulfur trioxide and ammonia, and the interaction between the two conditioning agents and the particulate and the apparatus, have been documented, as shown in FIG. 2, it will be appreciated that they are not fully understood from a scientific standpoint. The modern power plant operates under a variety of conditions such as differing power output levels, fuel types, electrostatic precipitator types and power consumption levels, and so forth. Moreover, different power plants (or even a single power plant, under different operating conditions) may be most severely limited by different aspects of the environmental protection laws. That is, one plant, with a particular configuration of equipment, fuel, and operating conditions, may find it most difficult to meet sulfur emission limitations. Another plant, with a different configuration of equipment, fuel, and operating conditions, may find it most difficult to meet particulate emission limitations. The approach of the present invention permits the plant to be operated in an optimal manner within the constraints of the emission laws.

To control the operation of the injection apparatus 30 and 34, a controller 60 is provided. Briefly, the controller 60 receives feedforward and feedback signals indicative of the state of the flue gas stream 20, and adjusts the flow rates of the conditioning agents responsive to particular control procedures within the controller 60. The preferred feedforward signal is a boiler load signal 62, sent to the controller 60 from a boiler load sensor 64. The boiler load sensor 64, which is preferably a flow meter, measures the rate at which fuel is burned within the combustor 12, as a measure of the total volume or mass of flue gas and particulate that must be conditioned. Alternatively, the heat produced, the flow rate of flue gas, the flow rate of water in the boiler, the electrical output of the plant, or other acceptable factors could provide this indication of the total flue gas and particulate loading that must be conditioned.

There are several feedback signals that are preferably utilized in controlling the conditioning agent flows. One is the power consumption of the electrostatic precipitator 40, which is provided as a power consumption signal 66 from the electrostatic precipitator controller 48 to the injection controller 60. The power consumption of the electrostatic precipitator is the power, voltage times current, flowing between the electrodes 42 and the plates 44. Since electrostatic deposition fundamentally occurs by the conduction of charge by the particulate matter deposited in the layer 46, when more power is consumed by the precipitator 40, more particulate is removed from the flue gas stream 20. The power consumption of the electrostatic precipitator is a numerical value readily available from all modern commercial controllers 48, and therefore no new instrumentation is required.

A second preferred feedback signal is the residual sulfur content of the flue gas after it has left the electrostatic precipitator 40. A residual gas content signal 68 is provided from a sensor 70 in the flue gas stream to the controller 60. (Equivalently, the sulfur level may be measured in terms of a sulfur compound, such as sulfur dioxide or sulfur trioxide. If sulfur is present in several forms, normally the various levels are considered in a single reporting format.) The residual sulfur content is the sulfur content, such as in parts per million by volume of the gas stream, that is emitted from the power plant into the atmosphere. Under existing environmental laws, there are strict limits on the residual sulfur content. Instruments for measuring the residual sulfur content, which may serve as the sensor 70, are commercially available. Examples of acceptable sensors 70 are the Severn Sciences Ltd. Model SSL/MEL for sulfur trioxide and the Westinghouse Model EC 960 for sulfur dioxide. The residual ammonia content may also be measured by the sensor 70 and provided as part of the signal 68, and a suitable ammonia sensor is the Horiba Model C900. As was discussed earlier, the proper amount of injected ammonia can react with excess sulfur trioxide to form an ammonium compound, removing the sulfur trioxide from the flue gas and preventing it from being emitted.

A third preferred type of feedback signal is a stack gas opacity signal 72, which is measured by a stack gas opacity sensor 74 and provided to the controller 60. The sensor 74 measures the transmission of a beam of light through the stack gas (as the flue gas is termed after it leaves the electrostatic precipitator). The opacity is most directly responsive to the particulate level in the stack gas. Acceptable opacity analyzers, that may be used as the sensor 74, are available commercially and include the Lear Siegler Model RM 41.

The various feedforward and feedback signals are indicated in FIG. 1 as being provided to the controller 60. Preferably, the signals are provided automatically, as with a digital readout of the sensor or through an analog-to-digital conversion of an analog readout of the sensor. Equivalently, the signal can be hand-fed to the controller 60, as by typing in the signal value. An automatic input is preferred, as it permits the taking of many samples and building a statistical data base, without the need for human intervention. However, in some cases it may be sufficient to manually input the feedforward signal from a calibration of gas or particulate flow against a measured fuel consumption, because the feedforward signal typically changes only infrequently.

Figure 3:
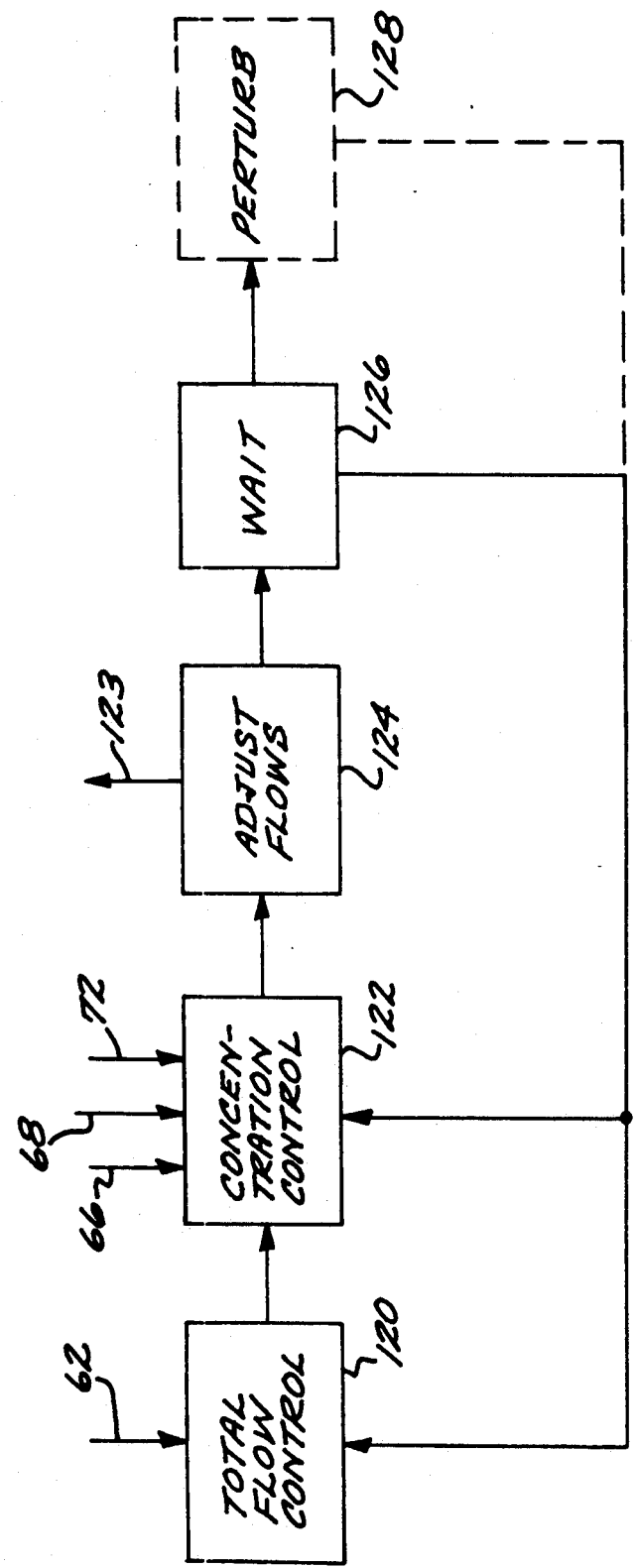
FIG. 3 is a block flow chart of the operation of the controller.

These feedforward and feedback signals, and others as may be found to be useful, are utilized by the controller 60 to determine and control the optimum flow rates of the conditioning agents. The general procedure for the operation of the controller is illustrated in FIG. 3. The feedforward signal 62 is provided to a total flow control function 120, which determines the total flow rates of each of the conditioning agents, in units such as pounds injected per unit time. The total flow control function 120 may be based upon a simple linear relation between boiler load and total flow rates, for example. Under such a linear relationship, if for example the total flow rate of flue gas in mass per unit time as measured by the feedforward signal 62 is doubled, the mass flow rate of conditioning agents in mass per unit time, injected by apparatus 30 and 34, is also doubled. More complex relationships may also be used, as appropriate for a particular power plant. That is, it may be known from experience that in certain operating regimes the relation between flow rate of conditioning agents and flow rate of flue gas is nonlinear, and this experience is programmed into the controller 60.

The feedback signals 66, 68, and 72 are received by a concentration control function 122. The concentration control function 122 determines the required values of the operating flow concentration levels, in units such as parts per million, for the conditioning agents in the apparatus 30 and 34. The determination is based upon either theoretical or empirical relations between magnitudes of the control signals 66, 68, and 72, and required changes in one or more of the conditioning agents. Four specific preferred embodiments for the control procedures are discussed subsequently. Alternatively, the perturbation procedure described subsequently is used to establish operating relations.

However determined, the concentration flow rates in parts per million are converted by control function 122 to a mass flow of conditioning agents per unit time by multiplying by the mass flow of flue gas per unit time, which is known from the feedforward signal 62. The mass flows of conditioning agents per unit time are provided to the apparatus 30 and 34, in a manner to be described. (Of course, absolute values are not required, as relative mass flow signals to be sent to apparatus 30 and 34 are sufficient.)

There may be substantial time delays between the injection of a conditioning agent and its effect upon the precipitator performance or the stack gas, and the control function 122 includes the capability to introduce such delays where necessary. For example, depending upon the construction of a particular system, there may be a delay of as much as several hours between an increase in the sulfur trioxide injection concentration and an increase in one of the feedback signals whose origin can be traced to the increased sulfur trioxide injection. Such time delays are measured during initial calibration of the power plant and the control system, and incorporated into the programming.

Similarly, there can be a time delay of minutes or hours between the time when the flow of conditioning agent is discontinued and the time when its effect is lost. Thus, the effect of an ammonia addition may persist for hours in reduced magnitude of rapping spikes, even after the ammonia flow has been discontinued. This phenomenon permits the flow of a conditioning agent to be periodically interrupted to conserve on costs, while retaining nearly its full beneficial effect.

The operating flow levels of the conditioning agents are transmitted to the apparatus 30 and 34, and specifically the flow control devices 33 and 36, respectively, through a control cable 123, as indicated schematically at adjustment block 124. The controller then waits a predetermined time period, wait block 126, before repeating the procedure. As discussed previously, the operating control of a large power plant is on the time scale of tens of minutes or even hours, not seconds, and the waiting period between adjustments is typically tens of minutes or hours. The sampling of the signals 62, 66, 68, and 72 may occur more frequently to build up a statistical basis for actions, but adjustments normally occur less frequently.

FIG. 3 shows in dashed lines a perturb block 128 that may be utilized in the control procedure. Because at this time there is not a complete scientific understanding of all of the chemical and physical interactions occurring in the system, it is not possible to know whether true optimum values of the flow rates of the conditioning agents have been reached, or whether a particular set of operating values may be a local optimum resulting from the nature of the interactions. In the future, some complete closed form or parametric understanding of the interactions may be discovered, but that is not available now. Therefore, to test the effect of changes in the flow rate of one of the conditioning agents upon the overall system performance, that flow rate can be forced to a value which the control functions 120 and 122 did not select. The control function 122 then adjusts the flow rate of the other conditioning agent responsive to the inputs 66, 68, and 72 that result from the perturbation. If the resulting performance in gaseous emission and particulate is improved, according to some figure of merit that is defined, then the perturb function judges that the new set of flow rates, resulting from the perturbation, is superior to the prior solution. If the performance is not improved, the flow parameters are returned to their prior values, possibly followed by perturbation in a different direction. In this manner, the controller 60 continually searches for better overall performance relationships.

The controller 60 is preferably a digital microcomputer. It is programmed with the procedures depicted in FIG. 3, and with control algorithms of the type to be discussed next. It also stores calibration data for the particular plant. As discussed previously, each power plant is unique, and there can be no optimal values specified that will be valid for all plants. Instead, a major advantage of the present approach is that it is adaptive. Plant calibration data that is determined from initial calibration testing and from actual operating results define the characteristics of the plant, and are stored in the computer. The procedures such as the perturbation function can add to this data base by providing the results of other operating conditions, and by improving the statistical certainty of the stored data. The controller thus learns as operating experience is gathered. For example, it may be initially assumed that the total flow rate of the conditioning agents should be linearly proportional to boiler load. Operating experience may instead show that there is a slight nonlinearity over some operating ranges, and that information is then added to the data base so that future adjustments benefit from the new information.

There are a wide variety of control algorithms that may be incorporated into the control functions 120 and 122 of the controller 60. The reason for this variety is that different feedback signal combinations can be used, and in some cases the system is overdetermined because there is more measured data available than required for the solution of two unknowns, the flow rates of the two conditioning agents. The availability of extra information is useful, because it facilitates the search for true optimal plant operating conditions, particularly where the power plant may have difficulty meeting only one of the emission and particulate limitations. In the following paragraphs, four presently preferred embodiments utilizing different combinations of measured signals and control relationships are set forth, although many others can be envisioned. For definiteness in discussion of these preferred embodiments, the conditioning agents are taken to be the preferred sulfur trioxide and ammonia gases.

In each of these embodiments, the total flow rate in mass per unit time of each of the conditioning agents is determined from the feedforward boiler load signal 62 and a linear relation or calibration curve for the plant. The larger the signal 62, the more total conditioning agents are added. Within this constraint, the ratio of the two conditioning agents is determined in one of four ways.

In the first embodiment, a portion of the total flow of the sulfur trioxide and ammonia conditioning agents is established according to a preselected ratio. The preselected ratio is determined for the power plant during calibration as its best performance characteristic. A second portion of conditioning agents is added to these amounts, and typically the second portion is additional sulfur trioxide. The relative amount of the first portion is established responsive to the opacity signal 72, to minimize particulate loss to the stack gas. The relative amount of the second portion is established responsive to the electrostatic precipitator power consumption signal 66, to maximize that value. The relative amount of the second portion can also be controlled responsive to the residual sulfur signal 68, to minimize that value.

In a second embodiment, the total flow rate of sulfur trioxide is adjusted responsive to the electrostatic power consumption signal 66 or the residual sulfur signal 68, as just described for the second portion under the first embodiment. The total flow rate of injected ammonia is adjusted to minimize the opacity signal 72, since the ammonia can increase the adherence of the particulate to resist reentrainment.

In a third embodiment, the flow rate of ammonia is controlled in response to the opacity signal 72. The sulfur trioxide is adjusted according to a preset ratio with the ammonia.

In a fourth embodiment, the sulfur trioxide and the ammonia flows can be adjusted independently, as long as the total flow of the conditioning agents is that required by the total flow computation based upon the feedforward signal. The functional operation of this embodiment will be described by way of illustration of the optimization and perturbation processes. In one type of power plant, as the sulfur trioxide injection flow rate increases from below an optimum value, the power consumption of the electrostatic precipitator increases and the opacity spikes during rapping increase. The ammonia content can then be increased relative to the sulfur trioxide content, which reduces the effective sulfur trioxide content as a result of the ammonium bisulfate reaction. The precipitator power may decrease so that the total capture of particulate decreases, but at the same time the deposition of ammonium bisulfate on the particulate matter results in smaller opacity spikes during rapping. As the changes in the feedback signals are computed and/or graphed, minima in emissions or optimal values can be discerned. The selected operating values may not be the mathematical joint minimal values, due to environmental laws that are more stringent for some emissions than for others and economic considerations such as the difficulty in selling recovered fly ash that is high in ammonia content. Such legal constraints are provided to the controller in the form of constraints or weighting factors for decision making.

Once an acceptable solution is reached, the perturbation function can optionally be used to intentionally change a flow rate away from the solution to ascertain the effect on the other flow rates. The system will find a new set of flow rates which may be even better than the prior solution, and the system then adopts that solution. If at a later time the feedforward signal changes, indicating a change in total flue gas flow and thence particulate flow, the optimization procedure is repeated. Each optimal set of operating conditions is stored in the computer memory, and the control functions 120 and 122 check these values during optimization. In this way, prior experience is used to reduce the time needed to reach the best combination of conditioning agents for any particular operating conditions. The reduction in the search time to reach the desired combination reduces the time that the system operates in a non-optimal condition with higher emissions.

The present invention thus provides a general apparatus and method for controlling the flow rates of additions of conditioning agents to flue gas streams of power plants. While general in form, the control process is particularized to an individual power plant, its operational characteristics, the type of coal used, and individual restrictions in the environmental laws, through calibration of the control system with actual power plant performance information. Although a particular embodiment of the invention has been described in detail for purposes of illustration, various modifications may be made without departing from the spirit and scope of the invention. Accordingly, the invention is not to be limited except as by the appended claims.

What is claimed is:

1. Apparatus for controlling the addition of conditioning agents to a particulate-containing flue gas stream that passes through an air preheater and subsequently passes through a set of precipitation electrodes of an electrostatic precipitator before being exhausted to the atmosphere, comprising:

means for adding at least two conditioning agents, which chemically interact with the particulate matter in the flue gas and with each other, to a stream of flue gas, at least one of the conditioning agents being added to the flue gas stream after the flue gas stream has passed through the air preheater but before it passes through the set of precipitation electrodes;

a feedforward sensor that senses the flue gas and provides a feedforward signal indicative of the mass flow rate of particulate matter in the flue gas prior to the addition of the conditioning agents;

a feedback sensor that senses the flue gas after the addition of the conditioning agents, and produces a feedback signal indicative of the physiochemical effect on the flue gas/particle stream of the addition of the conditioning agents; and a controller that receives the feedforward signal and the feedback signal, and adjusts the amounts of the conditioning agents added to the flue gas stream based upon the values of the signals.

2. The apparatus of claim 1, further including:
   a second feedback sensor that senses the flue gas after the addition of the conditioning agents, and produces a second feedback signal indicative thereof.

3. The apparatus of claim 1, wherein the feedforward sensor measures the volume of particulate matter carried by the flue gas.

4. The apparatus of claim 1, wherein the feedforward sensor measures the firing rate of the combustor.

5. The apparatus of claim 1, wherein the feedback sensor is a stack gas opacity monitor.

6. The apparatus of claim 1, wherein the feedback sensor is a residual sulfur trioxide monitor.

7. The apparatus of claim 1, wherein the feedback sensor is a residual ammonia monitor.

8. The apparatus of claim 1, wherein the feedback sensor measures the power utilized by the electrostatic precipitator.

9. The apparatus of claim 1, wherein the controller is a digital microcomputer.

10. The apparatus of claim 9, wherein the microcomputer includes an instruction set that controls the total flow rate of conditioning agents added responsive to the feedforward signal.

11. The apparatus of claim 10, wherein the microcomputer includes an instruction set that controls the relative amounts of conditioning agents added responsive to the feedback signal.

12. The apparatus of claim 1, wherein the controller adjusts the flow of at least one of the conditioning agents to be an intermittent flow.

13. The apparatus of claim 12, wherein the conditioning agent that flows intermittenly is ammonia.

14. The apparatus of claim 1, wherein one of the conditioning agents is sulfur trioxide.

15. The apparatus of claim 1, wherein one of the conditioning agents is ammonia.

16. A process for controlling the addition of conditioning agents to a stream of a flue gas containing particulate matter in a flue gas cleanup system having a conditioning agent injector, an electrostatic precipitator to which the flue gas passes after the conditioning agent is added, and an exhaust from the electrostatic precipitator, comprising the steps of:
   adding at least two conditioning agents, which chemically interact with the particulate matter in the flue gas and with each other, to the flue gas stream;
   sensing the flue gas prior to the addition of the conditioning agents, and providing a feedforward signal indicative of the mass flow rate of particulate matter in the flue gas;
   sensing the flue gas after the addition of the conditioning agents, and providing a feedback signal indicative of the physiochemical effect on the flue gas/particulate stream of the addition of the conditioning agents; and
   controlling the amounts of the conditioning agents added to the flue gas stream based upon the values of the feedforward signal and the feedback signal.

17. The process of claim 16, wherein the step of sensing the flue gas prior to the addition of the conditioning agent includes the step of
   measuring the boiler load.

18. The process of claim 16, wherein the step of sensing the flue gas after the addition of the conditioning agent includes the step of measuring the opacity of the flue gas after it has left the electrostatic precipitator.

19. The process of claim 16, wherein the step of sensing the flue gas after the addition of the conditioning agent includes the step of measuring the residual sulfur trioxide content in the flue gas after it has left the electrostatic precipitator.

20. The process of claim 16, wherein the step of sensing the flue gas after the addition of the conditioning agent includes the step of measuring the power consumption of the electrostatic precipitator.

21. The process of claim 16, wherein
   the step of sensing the flue gas prior to the addition of the conditioning agent includes the step of measuring the boiler load, and
   in the step of controlling, the total flow rate of conditioning agents is dependent upon the feedback signal.

22. The process of claim 16, wherein the conditioning agents are sulfur trioxide and ammonia.

23. The process of claim 22, wherein
   the step of sensing the flue gas after the addition of the conditioning agent includes the step of measuring the residual sulfur trioxide content in the flue gas after it has left the electrostatic precipitator,
   the step of sensing the flue gas after the addition of the conditioning agent includes the step of measuring the opacity of the flue gas after it has left the electrostatic precipitator,
   the step of sensing the flue gas after the addition of the conditioning agent includes the step of measuring the power consumption of the electrostatic precipitator, and
   in the step of controlling,
   the flow rate of ammonia conditioning agent added is dependent upon the opacity of the flue gas, and
   the flow rate of sulfur trioxide conditioning agent added is dependent upon the power consumption of the electrostatic precipitator and the residual sulfur trioxide.

24. The process of claim 22, wherein
   the step of sensing the flue gas after the addition of the conditioning agent includes the step of measuring the opacity of the flue gas after it has left the electrostatic precipitator, and
   in the step of controlling,
   the flow rate of ammonia conditioning agent added is dependent upon the opacity of the flue gas, and
   the flow rate of sulfur trioxide is determined as a constant times the flow rate of ammonia.

25. The process of claim 22, wherein
   the step of sensing the flue gas prior to the addition of the conditioning agent includes the step of measuring the boiler load,
   the step of sensing the flue gas after the addition of the conditioning agent includes the step of measuring the residual sulfur content in the flue gas after it has left the electrostatic precipitator,
   the step of sensing the flue gas after the addition of the conditioning agent includes the step of measuring the power consumption of the electrostatic precipitator, and
   in the step of controlling,
   the total flow rate of conditioning agents is dependent upon the boiler load signal, and
   the flow rate of sulfur trioxide conditioning agent added is dependent upon the power consumption of the electrostatic precipitator and the residual sulfur trioxide.

26. The process of claim 16, wherein at least one of the conditioning agents is added intermittently.

27. The process of claim 26, wherein the conditioning agent that is added intermittently is ammonia.

28. A process for controlling the addition of conditioning agents to a stream of a flue gas containing particulate matter, comprising the steps of:
   adding at least two conditioning agents, which chemically interact with the particulate matter in the flue gas and with each other, to the flue gas stream at a location after the flue gas has left a boiler;
   sensing the flue gas prior to the addition of the conditioning agents, and providing a feedforward signal indicative of the mass flow rate of particulate matter in the flue gas;
   sensing the flue gas after addition of the conditioning agents, and providing a feedback signal indicative of the physiochemical effect on the flue gas/particulate stream of the addition of the conditioning agents; and controlling the amounts of the conditioning agents added to the flue gas by establishing the total flow of the conditioning agents responsive to the feedforward signal, and establishing the ratio of the conditioning agents responsive to the feedback signal.

29. The process of claim 28, wherein the conditioning agents are sulfur trioxide and ammonia.

* * * * *